JACOB AMBUHL.
Improvement in Apparatus for Carbureting Hydrogen Gas.
No. 114,744. Patented May 16, 1871.
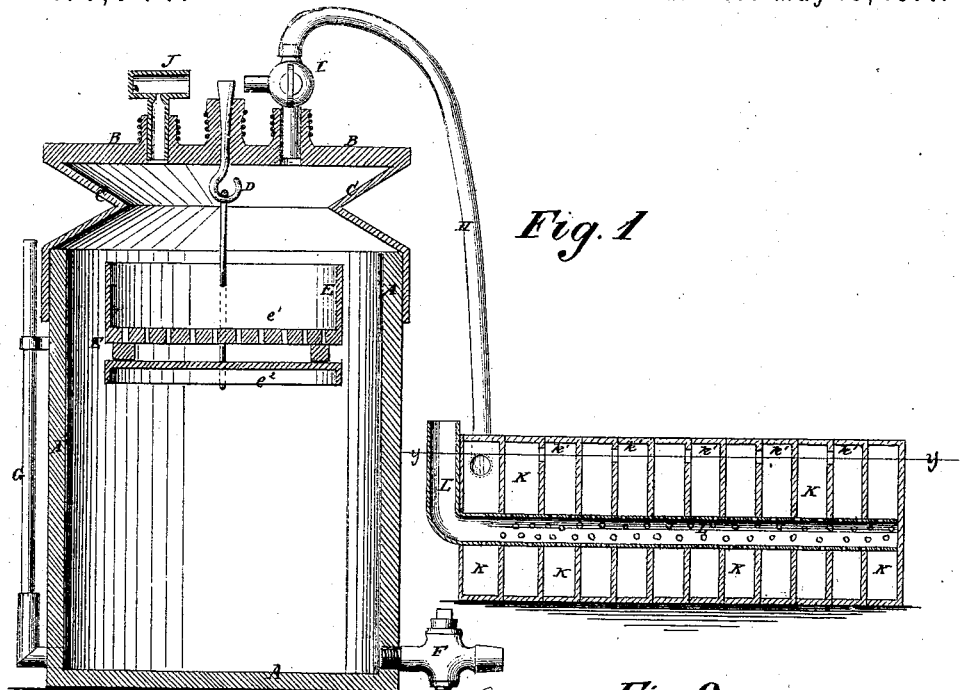
Fig. 1
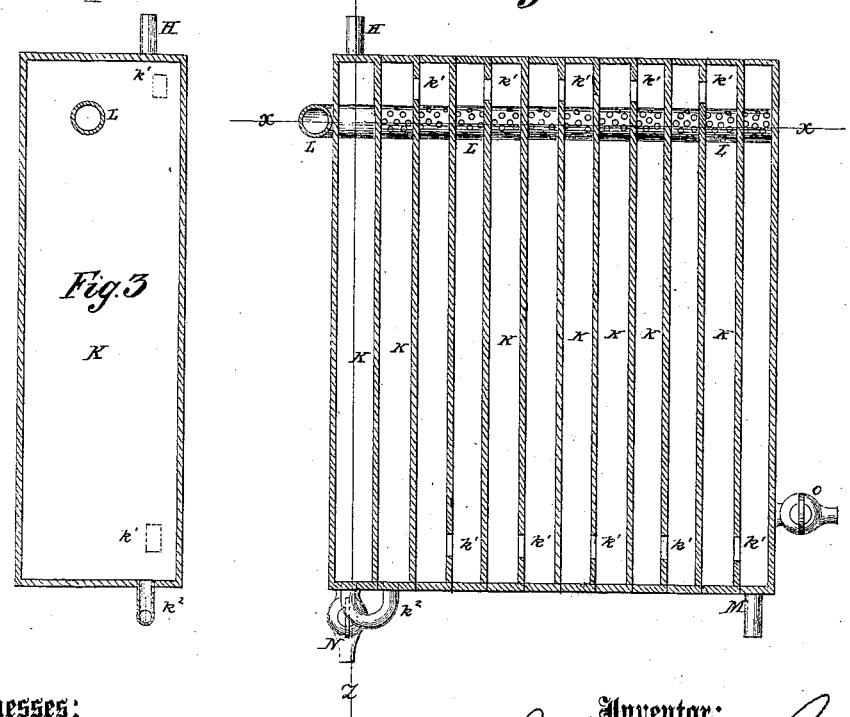
Fig. 2
Fig. 3

UNITED STATES PATENT OFFICE.

JACOB AMBUHL, OF MORRISTOWN, NEW JERSEY.

IMPROVEMENT IN APPARATUS FOR CARBURETING HYDROGEN GAS.

Specification forming part of Letters Patent No. 114,744, dated May 16, 1871.

*To all whom it may concern:*

Be it known that I, JACOB AMBUHL, of Morristown, in the county of Morris and State of New Jersey, have invented a new and useful Improvement in Apparatus for Carbureting Hydrogen Gas; and I do hereby declare that the following is a full, clear, and exact description thereof, which will enable others skilled in the art to make and use the same, reference being had to the accompanying drawing, forming part of this specification.

Figure 1 is a detail vertical section of my improved apparatus, taken through the line $x\,x$, Fig. 2. Fig. 2 is a detail horizontal section of the carbureter, taken through the line $y\,y$, Fig. 1. Fig. 3 is a vertical section of the same, taken through the line $z\,z$, Fig. 2.

My invention has for its object to furnish an improved apparatus for carbureting hydrogen gas for illuminating purposes, which shall be simple in construction and effective in operation, furnishing a superior gas at a diminished expense; and it consists in the construction and combination of various parts of the apparatus, as hereinafter more fully described.

A is the tank in which the hydrogen gas is generated. The capacity of the tank A depends upon the amount of gas to be supplied, or, in other words, to the number of burners to be supported.

B is the top plate or cover, which is connected with the top of the tank A by a rubber connection, C, so that the cover B may yield to or be raised by the pressure of the gas which is forced out by the weight of the said cover B. From the top B or from a hook, D, attached to said cover B, is suspended a wooden basket, E, to receive the iron filings or turnings.

The bottom of the basket E is perforated to allow the water or dilute sulphuric acid contained in the tank A to have free access to the iron contained in said basket.

Beneath the perforated bottom $e^1$ is placed a close bottom, $e^2$, to receive any small pieces of iron that may drop through the holes in the upper bottom, $e^1$, to prevent the said pieces of iron from dropping to the bottom of the tank A.

The tank A is filled and emptied through the stop-cock F, as may be required.

The tank A is provided with a glass gage-pipe, G, in which the water or acid stands at the same height as in the tank, so that it may be conveniently seen when the tank has been sufficiently supplied.

The hydrogen gas passes from the generator to the carbureter through the pipe H, which is connected with the tank A by a three-way cock, I, one of its openings being connected with the tank A, the second with the pipe H, and the third being left free, and being so arranged as to point toward a stand, J, attached to the cover B, to receive a piece of platinum sponge.

When the tank has been charged the cock I is so adjusted that the air in the tank and the hydrogen gas, as generated, may escape through the open way or branch of said cock, and impinge upon the platinum sponge attached to the stand J, which sponge will become red hot when the air has all escaped from the tank A and pure hydrogen is escaping. The cock I is then adjusted to cause the hydrogen to pass through the pipe H to the carbureter.

The body of the carbureter is formed of a series of ten (more or less) shallow rectangular pans, K, which are set parallel with each other, and are securely soldered together.

The pans or narrow compartments K, except the first one, are filled with granulated charcoal.

The pans have openings $k^1$ formed through them, near the ends of their upper sides, which openings are formed near the opposite ends of the said pans alternately, as shown in Fig. 2, the first compartment or pan K having no opening $k^1$ in it. The first pan or compartment K is connected by a short return-pipe, $k^2$, with the second pan or compartment, as shown in Figs. 2 and 3.

The first compartment K is filled with granulated charcoal and soda, and with this compartment is connected the pipe H, leading to the generator.

The carbureter is supplied with gasoline or other suitable light hydrocarbon oil through the pipe L, which passes through the middle part of the pans K near one end. The pipe L is perforated with numerous holes opening into all the said pans except the first one. The hydrogen enters the first compartment K, is purified by the soda, passes thence into and circulates through all the other compartments, where it becomes carbureted, and escapes from the last compartment into the pipe M, through which it passes to the burners.

Any water that may form in the first compartment K is drawn off through the stop-cock N, and any surplus oil that may remain in the other pans or compartments K may be drawn off through the stop-cock O.

Having thus described my invention, I claim as new and desire to secure by Letters Patent—

1. The elastic neck or connection C of the top B applied to the tank A, as and for the purpose specified.

2. A three-way cock, I, connected with the pipe leading from the tank, combined, as described, with the pipe holding the platinum sponge and the conveyer-pipe H, for the purpose specified.

3. The granulated charcoal saturated with oil, arranged in a series of connected pans, combined with charcoal and soda, arranged in a preceding pan connected therewith, for the purpose specified.

JACOB AMBUHL.

Witnesses:
   JAS. C. YOUNGBLOOD,
   J. H. VAN DOREN.